United States Patent
Han et al.

(10) Patent No.: US 11,899,744 B2
(45) Date of Patent: Feb. 13, 2024

(54) APPARATUS AND METHOD OF PERFORMING MATRIX MULTIPLICATION OPERATION OF NEURAL NETWORK

(71) Applicant: Samsung Electronics Co., Ltd., Suwon-si (KR)

(72) Inventors: Songyi Han, Hwaseong-si (KR); Hyunsun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 637 days.

(21) Appl. No.: 16/851,361

(22) Filed: Apr. 17, 2020

(65) Prior Publication Data
US 2021/0173895 A1 Jun. 10, 2021

(30) Foreign Application Priority Data
Dec. 6, 2019 (KR) .................. 10-2019-0161676

(51) Int. Cl.
*G06F 17/16* (2006.01)
*G06N 3/08* (2023.01)
*G06F 18/213* (2023.01)

(52) U.S. Cl.
CPC ............ *G06F 17/16* (2013.01); *G06F 18/213* (2023.01); *G06N 3/08* (2013.01)

(58) Field of Classification Search
CPC ......... G06F 17/16; G06K 9/6232; G06N 3/08
USPC ...................................................... 708/520
See application file for complete search history.

(56) References Cited

U.S. PATENT DOCUMENTS

| 8,301,576 | B2 | 10/2012 | Meng et al. |
| 9,710,265 | B1 | 7/2017 | Temam et al. |
| 10,096,134 | B2 | 10/2018 | Yan et al. |
| 10,430,493 | B1 * | 10/2019 | Kendall ............ G11C 13/0026 |

(Continued)

FOREIGN PATENT DOCUMENTS

| EP | 3832498 A1 * | 6/2021 | ........... G06F 17/153 |
| KR | 10-2019-0051697 A | 5/2019 | |
| KR | 10-2019-0062481 A | 6/2019 | |

OTHER PUBLICATIONS

Xiao et al. (CNN-MHSA: A Convolutional Neural Network and multi-head self-attention combined approach for detecting phishing websites, Neural Networks 125 (2020) 303-312) (Year: 2020).*

(Continued)

*Primary Examiner* — Iftekhar A Khan
(74) *Attorney, Agent, or Firm* — NSIP Law

(57) ABSTRACT

A neural network apparatus for performing a matrix multiplication operation includes a memory having at least one program stored therein and a processor to perform one or more operations by executing the at least one program. The processor can determine whether to divide an initial weight in one of a column direction and a row direction according to whether a reshape operation and a transpose operation are performed before or after a matrix multiplication operation and generate division weights by dividing the initial weight by a head count in the determined direction. Also, the processor can generate intermediate feature maps by performing a matrix multiplication operation between the input feature map and the division weights and generate a final feature map based on the intermediate feature maps.

20 Claims, 13 Drawing Sheets

(56) References Cited

U.S. PATENT DOCUMENTS

| | | | |
|---|---|---|---|
| 10,692,570 B2* | 6/2020 | Al-Shamma | G11C 16/26 |
| 11,423,291 B2* | 8/2022 | Ban | G06F 9/3013 |
| 11,423,436 B2* | 8/2022 | Cheng | G06N 20/00 |
| 11,562,046 B2* | 1/2023 | Park | G06N 3/063 |
| 2014/0149480 A1 | 5/2014 | Catanzaro et al. | |
| 2016/0328647 A1 | 11/2016 | Lin et al. | |
| 2017/0193361 A1 | 7/2017 | Chilimbi et al. | |
| 2018/0307783 A1 | 10/2018 | Hah et al. | |
| 2018/0341860 A1* | 11/2018 | Shazeer | G06N 3/045 |
| 2019/0012296 A1* | 1/2019 | Hsieh | G06N 3/04 |
| 2019/0130213 A1* | 5/2019 | Shazeer | G06V 10/56 |
| 2019/0138898 A1 | 5/2019 | Song et al. | |
| 2019/0205761 A1* | 7/2019 | Wu | G06F 16/353 |
| 2019/0251431 A1* | 8/2019 | Keskar | G06F 16/3344 |
| 2019/0251952 A1* | 8/2019 | Arik | G10L 13/08 |
| 2019/0354567 A1* | 11/2019 | Dehghani | G06N 3/044 |
| 2019/0354858 A1* | 11/2019 | Chrzanowski | G06N 3/044 |
| 2019/0354885 A1* | 11/2019 | Li | G06N 3/045 |
| 2019/0354894 A1* | 11/2019 | Lazovich | G06E 1/00 |
| 2019/0392319 A1* | 12/2019 | Shazeer | G06N 3/04 |
| 2020/0057648 A1* | 2/2020 | Liu | G06N 3/063 |
| 2020/0082215 A1 | 3/2020 | Aliabadi et al. | |
| 2020/0167637 A1* | 5/2020 | Park | G06F 7/44 |
| 2020/0312346 A1* | 10/2020 | Fazeli | G06N 3/088 |
| 2020/0342326 A1* | 10/2020 | Rahnama Moghaddam | G06N 3/048 |
| 2020/0365134 A1* | 11/2020 | Tu | G10L 15/04 |
| 2020/0365138 A1* | 11/2020 | Kim | G10L 15/22 |
| 2020/0410337 A1* | 12/2020 | Huang | G06N 3/04 |
| 2021/0081672 A1* | 3/2021 | Kadav | G06N 3/08 |
| 2021/0173895 A1* | 6/2021 | Han | G06N 3/08 |

OTHER PUBLICATIONS

Bai et al. (A Time Delay Neural Network with Shared Weight Self-Attention for Small-Footprint Keyword Spotting, INTERSPEECH 2019, pp. 2190-2194 (Year: 2019).*

Liu, Haijun, et al. "Attention: A big surprise for cross-domain person re-identification." *arXiv preprint arXiv:1905.12830* (2019). (16 pages in English).

Extended European Search Report dated Jan. 18, 2021 in counterpart EP Patent Application No. 20181975.2 (11 pages in English).

Vaswani, A et al.: "Attention Is All You Need", arXiv:1706.03762v5 [cs.CL], Dec. 6, 2017, pp. 1-15.

Jian Li, et al.: "Information Aggregation for Multi-Head Attention with Routing-by-Agreement", ARXIV:1904.03100VI [CS.CL], Apr. 5, 2019.

Rachel Draelos: "The Transformer: Attention Is All You Need", Glass Box webpage, Aug. 15, 2019.

Alexander Rush et al.: "The Annotated Transformer", Harvard NLP webpage, Apr. 3, 2018.

Anonymous: "bert/modeling.py", Github google-research/bert, last commit on Feb. 7, 2019.

Anonymous: "Multi_Head Attention in BERT different from Transformer?", GitHub huggingface/transformers, Issue #999, Aug. 2019.

Anonymous: "Transformer with Python and TensorFlow 2.0—Attention Layers", Rubik's Code website, Aug. 5, 2019.

* cited by examiner

APPARATUS AND METHOD OF PERFORMING MATRIX MULTIPLICATION OPERATION OF NEURAL NETWORK

CROSS-REFERENCE TO RELATED APPLICATION

This application claims the benefit under 35 U.S.C. § 119 of Korean Patent Application No. 10-2019-0161676, filed on Dec. 6, 2019, in the Korean Intellectual Property Office, the entire disclosure of which is incorporated herein by reference for all purposes.

BACKGROUND

1. Field

The following description relates to apparatuses and methods of performing a matrix multiplication operation of a neural network.

2. Description of Related Art

Neural networks refer to computational architectures modeling biological brains. With the development of neural network technology, neural networks are used in various types of electronic systems to analyze input data and extract valid information.

Research has been actively conducted into a hardware accelerator for efficiently using a deep neural network (DNN) at low power. A neural network processing apparatus requires a large amount of operations on complex input data.

Particularly, in a device implemented with low power and low performance, a technology capable of efficiently processing an operation on a neural network is required to extract desired information by analyzing a large amount of input data in real time by using the neural network.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Apparatuses and methods of performing a matrix multiplication operation of a neural network. Computer-readable recording mediums that store a program that, when executed by a computer, performs the methods.

In one general aspect, a neural network apparatus includes: a memory having at least one program stored therein; and a processor to perform one or more operations by executing the at least one program, wherein the processor acquires an input feature map and an initial weight from the memory, determines whether to divide the initial weight in a column direction or a row direction according to whether a reshape operation and a transpose operation are performed before or after a matrix multiplication operation, generates division weights by dividing the initial weight by a head count in the determined column direction or row direction, generates intermediate feature maps by performing a matrix multiplication operation between the input feature map and the division weights, and generates a final feature map based on the intermediate feature maps.

The processor may generate the division weights by dividing the initial weight by a head count in the column direction of the initial weight when the reshape operation and the transpose operation are performed after the matrix multiplication operation, and generate the final feature map by concatenating the intermediate feature maps.

The processor may generate the division weights by dividing the initial weight by a head count in the row direction of the initial weight when the reshape operation and the transpose operation are performed before the matrix multiplication operation, and generate the final feature map through an element-wise sum of the intermediate feature maps.

The matrix multiplication operation between the input feature map and the plurality of division weights may be one of a one-dimensional convolution operation and a two-dimensional convolution operation.

The processor may include a weight divider, and the weight divider may divide the initial weight by the head count in one of the column direction and the row direction.

In another general aspect, a method includes: acquiring an input feature map and an initial weight from a memory; determining whether to divide the initial weight in one of a column direction or a row direction according to whether a reshape operation and a transpose operation are performed before or after a matrix multiplication operation; generating division weights by dividing the initial weight by a head count in the determined column direction or row direction; generating intermediate feature maps by performing the matrix multiplication operation between the input feature map and the division weights; and generating a final feature map based on the intermediate feature maps.

In another general aspect, a method includes: receiving an initial feature map and an initial weight; dividing the initial weight into division weights; performing a matrix multiplication operation between the input feature map and each of the division weights to generate intermediate feature maps; and manipulating the intermediate feature maps to generate an output feature map.

The method may include determining whether the input feature map has been subjected to a reshape operation and a transpose operation.

In a case in which the input feature map has been subjected to the reshape operation and the transpose operation, the initial weight may be divided into the division weights based on a head count of the initial weight in a row direction.

The method may include generating the output feature map as an element-wise sum of the intermediate feature maps.

In a case in which the input feature map has not been subjected to the reshape operation and the transpose operation, the initial weight may be divided into the division weights based on a head count of the initial weight in a column direction.

The method may include generating the output feature map by concatenating the intermediate feature maps.

In another general aspect, a computer-readable recording medium stores a program that, when executed by a computer, performs one or more of the methods.

Other features and aspects will be apparent from the following detailed description, the drawings, and the claims.

BRIEF DESCRIPTION OF THE DRAWINGS

FIGS. 3A and 3B are diagrams for describing a reshape operation and a transpose operation according to an example.

Figure 1:
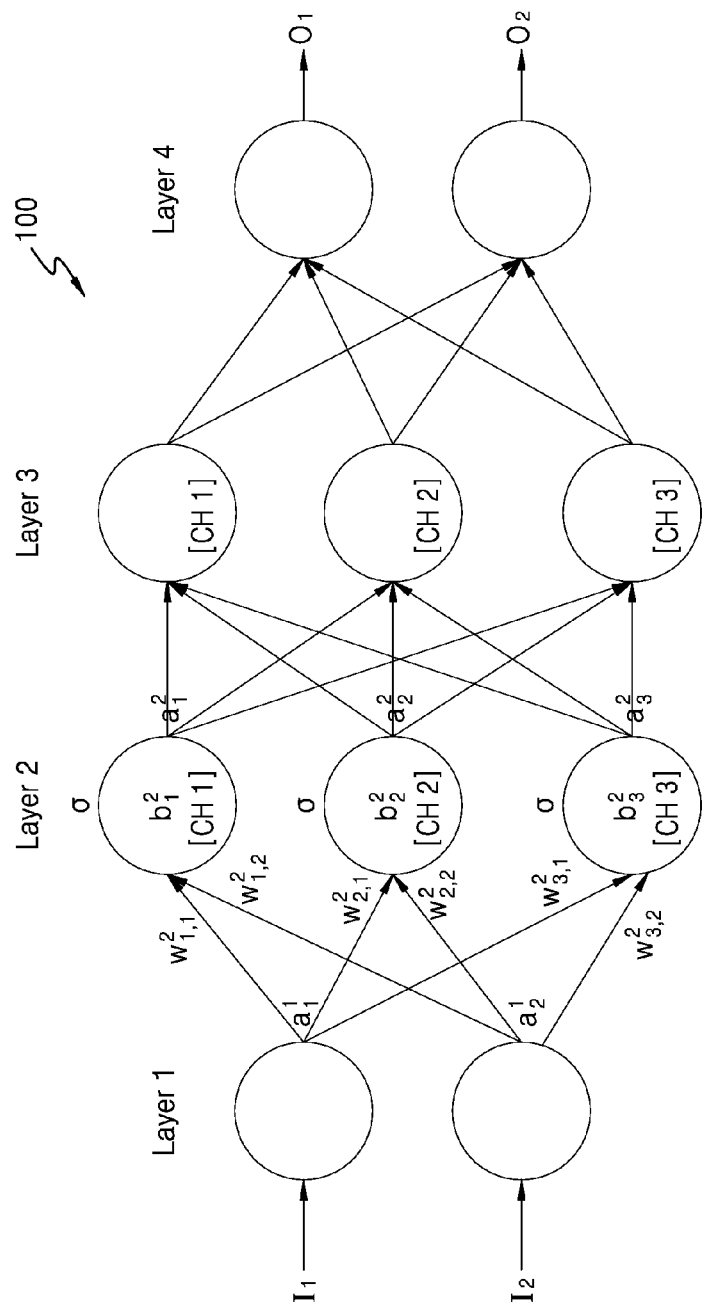
FIG. 1 is a diagram illustrating an operation performed in a deep neural network (DNN) according to an example.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Some examples may be represented in terms of functional block components and various processing operations. Some or all of these functional blocks may be implemented by any number of hardware and/or software components that execute particular functions. For example, the functional blocks may be implemented by one or more microprocessors or may be implemented by circuit components for a certain function. Also, for example, the functional blocks may be implemented in various programming or scripting languages. The functional blocks may be implemented by an algorithm that is executed in one or more processors. Terms such as "mechanism," "element," "unit," and "configuration" may be used in a broad sense and are not limited to mechanical and physical configurations.

Also, connection members or connection lines between elements illustrated in the drawings merely represent examples of functional connections and/or physical or logical connections. In actual apparatuses, the connection between elements may be represented by various alternative or additional functional connections, physical connections, or logical connections.

Hereinafter, examples will be described in detail with reference to the accompanying drawings.

FIG. 1 is a diagram illustrating an operation performed in a deep neural network (DNN) according to an example.

Referring to FIG. 1, a DNN 100 may have a structure including an input layer, hidden layers, and an output layer, and may perform an operation based on received input data (e.g., $I_1$ and $I_2$) and generate output data (e.g., $O_1$ and $O_2$) based on the operation performance result.

For example, as illustrated in FIG. 1, the DNN 100 may include an input layer (Layer 1), two hidden layers (Layer 2 and Layer 3), and an output layer (Layer 4). Because the DNN 100 may include more layers capable of processing valid information, the DNN 100 may process more complex data sets than a neural network having a single layer. Although the DNN 100 is illustrated as including four layers, this is merely an example, and the DNN 100 may include less or more layers or may include less or more channels. That is, the DNN 100 may include layers of various structures different from those illustrated in FIG. 1.

Each of the layers included in the DNN 100 may include a plurality of channels. The channel may correspond to a plurality of artificial nodes known as neurons, processing elements (PEs), units, or similar terms. For example, as illustrated in FIG. 1, Layer 1 may include two channels (nodes), and each of Layer 2 and Layer 3 may include three channels. However, this is merely an example, and each of the layers included in the DNN 100 may include various numbers of channels (nodes).

The channels included in each of the layers of the neural DNN 100 may be connected to each other to process data. For example, one channel may receive and operate data from other channels and output the operation result to other channels.

Each of the input and output of each of the channels may be referred to as input activation and output activation. That is, the activation may be an output of one channel and a parameter corresponding to the input of the channels included in the next layer. Moreover, each of the channels may determine its own activation based on the activations and weights received from the channels included in the previous layer. The weight may be a parameter used to calculate the output activation in each channel and may be a value allocated to the connection relationship between the channels.

Each of the channels may be processed by a computational unit or a PE that receives an input and outputs an output activation, and the input-output of each of the channels may be mapped. For example, when G is an activation function, $w_{j,k}^i$ is a weight from the kth channel included in the (i−1)th layer to the jth channel included in the ith layer, $b_j^i$ is a bias of the jth channel included in the ith layer, and $a_k^{i-1}$ is an activation of the jth channel of the ith layer, the activation may be calculated by using Equation 1 below.

$$a_j^i = \sigma(\Sigma_k(w_{j,k}^i \times a_k^{i-1}) + b_j^i) \quad \text{[Equation 1]}$$

As illustrated in FIG. 1, the activation of the first channel (CH 1) of the second layer (Layer 2) may be represented as $a_1^2$. Also, $a_1^2$ may have a value of $a_1^2 = \sigma(w_{1,1}^2 \times a_1^1 + w_{1,2}^2 \times a_2^1 + b_1^2)$ according to Equation 1. However, Equation 1 is merely an example for describing the activation and the weight used to process data in the DNN 100, and the examples not limited thereto. The activation may be a value obtained by passing a value obtained by applying an activation function to the sum of the activations received from the previous layer through a rectified linear unit (ReLU).

In an example, the DNN 100 may determine a factor defining the relationship between a descriptor and a property through learning based on the descriptor and a property value. That is, among Layer 1 to Layer 4 constituting the DNN 100, the descriptor may be Layer 1 that is the input layer, the property value may be Layer 4 that is the output layer, and the factor may be at least one hidden layer (Layer 2 and/or Layer 3).

The DNN 100 may perform an operation by using a descriptor as input data in the input layer and generate a property value as output data based on the operation performance result.

Figure 2:
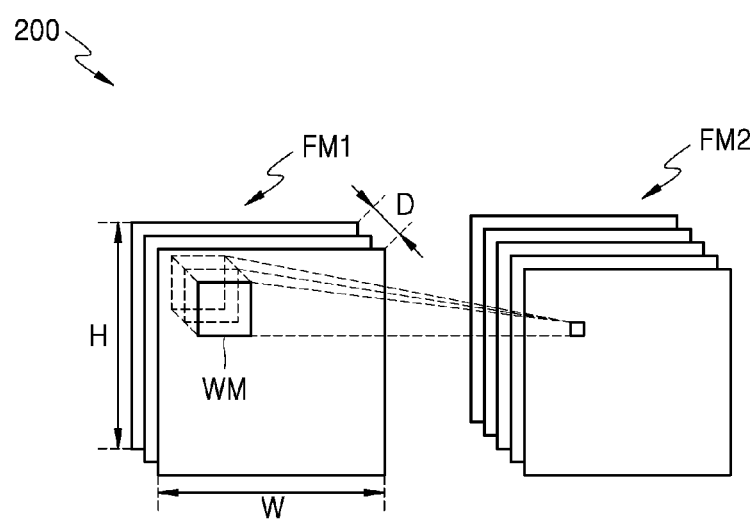
FIG. 2 is a diagram for describing the relationship between an input feature map and an output feature map in a neural network according to an example.

FIG. 2 is a diagram for describing the relationship between an input feature map and an output feature map in a neural network according to an example.

Referring to FIG. 2, in a layer 200 of the neural network, a first feature map FM1 may correspond to an input feature map and a second feature map FM2 may correspond to an output feature map. The feature map may refer to a data set representing various features of the input data. The feature maps FM1 and FM2 may have elements of a two-dimensional matrix or elements of a three-dimensional matrix, and a pixel value may be defined in each element. The feature maps FM1 and FM2 may have a width W (or a column), a height H (or a row), and a depth D. In this case, the depth D may correspond to the number of channels.

A convolution operation may be performed on the first feature map FM1 and a weight WM and as a result, the second feature map FM2 may be generated. The weight may be a weight defined in each element and may filter the features of the first feature map FM1 by performing a convolution operation with the first feature map FM1. The weight may perform a convolution operation with the windows (or tiles) of the first feature map FM1 while shifting the first feature map FM1 in a sliding window manner. During each shift, each of the elements included in the weight may be multiplied and added with each of the pixel values of an overlapped window in the first feature map FM1. As the first feature map FM1 and the weight are convoluted (convolved) together, one channel of the second feature map FM2 may be generated. Although one weight is illustrated in FIG. 2, a plurality of weights may each be convoluted with the first feature map FM1 to generate the second feature map FM2 of a plurality of channels.

Moreover, the second feature map FM2 may correspond to an input feature map of the next layer. For example, the second feature map FM2 may be an input feature map of a pooling (or subsampling) layer.

In FIG. 2, only a schematic architecture of the neural network is illustrated for convenience of description. However, those of ordinary skill in the art may understand that the neural network may be implemented by more or less layers, feature maps, weights, or the like, unlike the illustration, and the sizes thereof may also be modified in various ways.

Figure 3A:
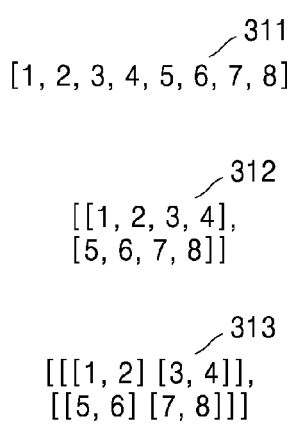
Figure 3B:
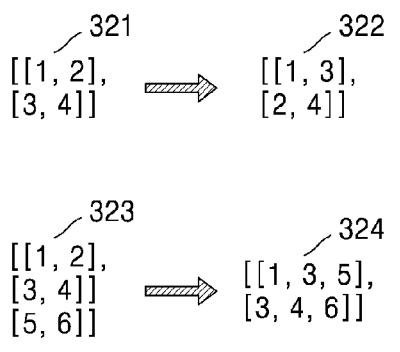

FIGS. 3A and 3B are example diagrams for describing a reshape operation and a transpose operation according to an example.

FIG. 3A illustrates a reshape operation process. The reshape operation may be a process of changing the structure of particular data. When particular data is reshaped, the data structure thereof may be changed but the data order thereof may not be changed.

For example, it is assumed that one-dimensional data 311 [1, 2, 3, 4, 5, 6, 7, 8] includes eight elements. When the one-dimensional data 311 is reshaped into a data structure of (2, 4), the structure of the one-dimensional data 311 may be changed into two-dimensional data 312 [[1, 2, 3, 4], [5, 6, 7, 8]].

Alternatively, when the one-dimensional data 311 is reshaped into a data structure of (2, 2, 2), the structure of the one-dimensional data 311 may be changed into three-dimensional data 313 [[[1, 2], [3, 4]], [[5, 6], [7, 8]]].

FIG. 3B illustrates a transpose operation process. The transpose operation may be a process of obtaining a new matrix by exchanging row and column values with each other. When particular data is transposed, only the data order thereof may be changed or both the data order and the data structure thereof may be changed depending on the initial structure of the particular data.

For example, when two-dimensional data 321 [[1, 2], [3, 4]] is transposed, it may be changed into two-dimensional data 322 [[1, 3], [2, 4]]. In this case, the data order may be changed but the data structure may be the same as before.

Alternatively, when two-dimensional data 323 [[1, 2], [3, 4], [5, 6]] is transposed, it may be changed into two-dimensional data 324 [[1, 3, 5], [2, 4, 6]]. In this case, not only the data order thereof but also the data structure thereof may be changed. That is, the two-dimensional data 323 of a (3, 2) structure may be changed into the two-dimensional data 324 of a (2, 3) structure.

Figure 4A:
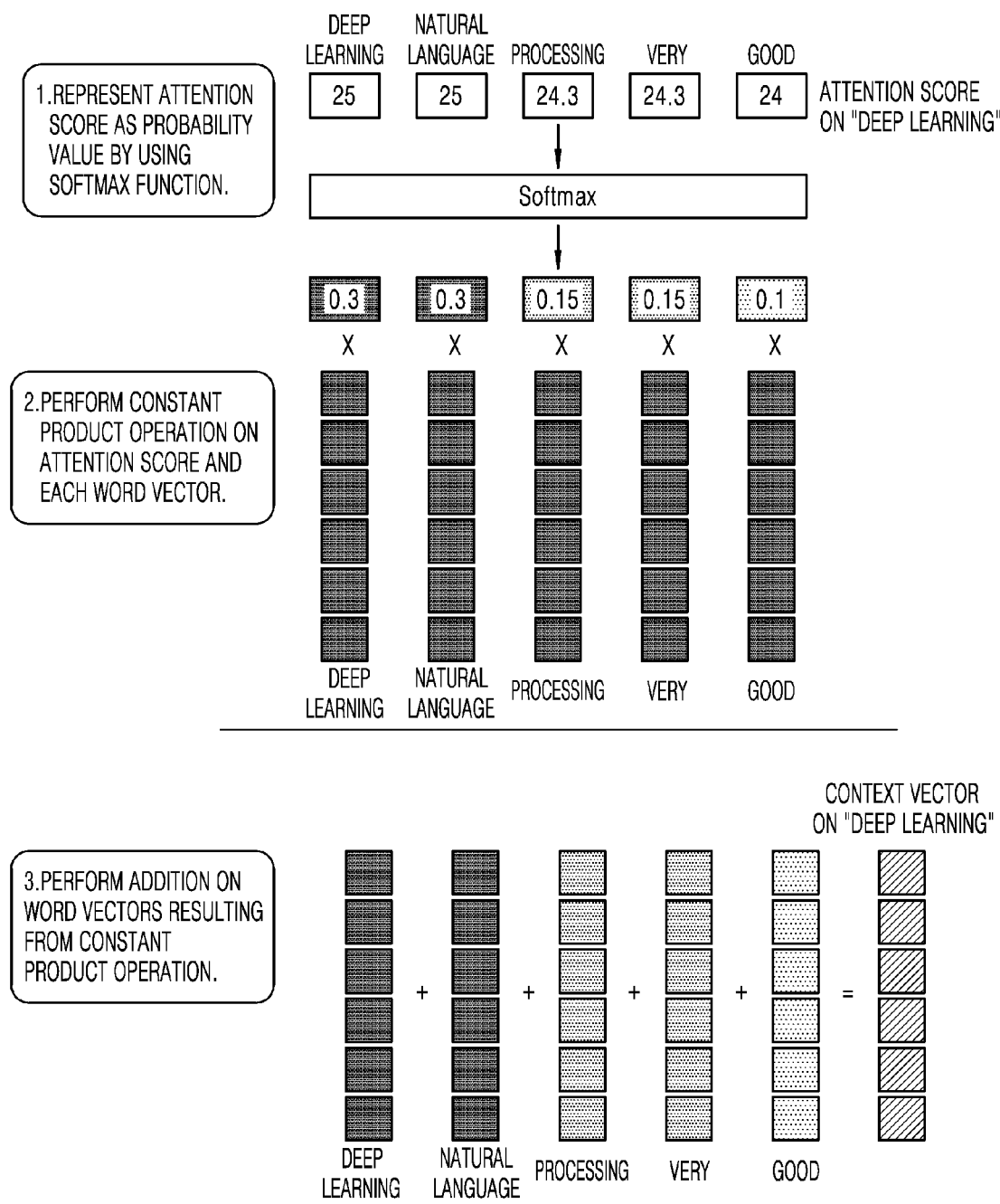
FIG. 4A is a diagram for describing a self-attention according to an example.

FIG. 4A is an example diagram for describing a self-attention according to an example.

The self-attention may be used to measure the relationship between words in a sentence. In this case, the relationship value of each word with other words may be calculated. This value may be referred to as an attention score. The attention score between highly related words may be high. A table of attention scores may be referred to as an attention map.

In a transformer model, an attention score may be obtained by performing a dot-product operation between word vectors. After an attention score of a particular word with respect to other words is obtained, a softmax function may be applied to an attention map where attention scores are collected. As a result, in the attention map, the correlation value of a particular word with respect to another word may appear in probability.

The probability value of the attention map and each existing word vector may be referred to as a weighted sum. The weighted sum may be an operation of multiplying and then adding each probability value and each word vector. The weighted sum result may be used as a vector value for a particular word.

Figure 4B:
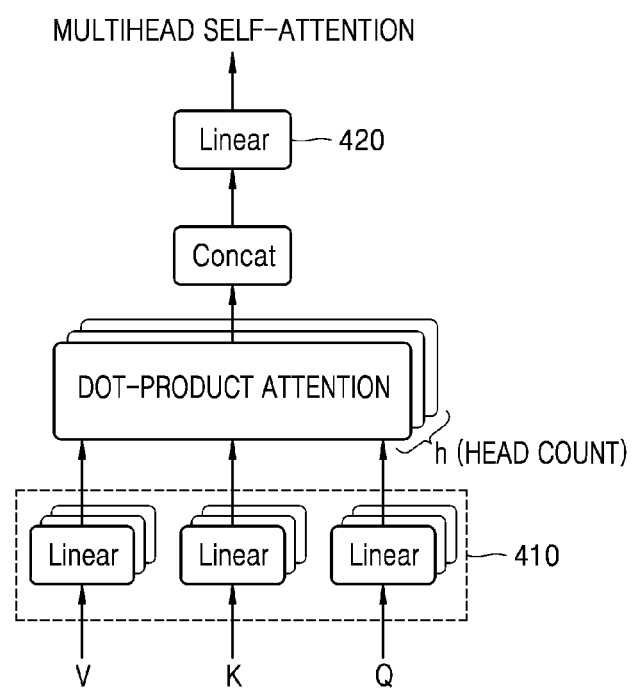
FIG. 4B is a diagram for describing a multihead self-attention according to an example.

FIG. 4B is an example diagram for describing a multihead self-attention according to an example.

The multihead self-attention may be a method of identifying attention on various feature values by generating a plurality of attention maps. The multihead self-attention may be used in a transformer model, an automatic speech recognition (ASR) model, or the like but is not limited thereto.

The multihead self-attention may have a form in which a scaled dot-product attention structure is overlapped. The input of a dot-product attention may include a query, a key, and/or a value. For example, in the case of finding the meaning of a particular word in an English dictionary, the particular word may correspond to the query, the word registered in the dictionary may correspond to the key, and the meaning of a key word may correspond to the value.

In order obtain the multihead self-attention, each of feature values for a value V, a key K, and a query Q may be divided by a head count h and then concatenated through a first linear layer 410 and dot-product attentions. Thereafter, when the concatenated value is finally output through a second linear layer 420, the multihead self-attention may be obtained.

In an example, a matrix multiplication operation, a reshape operation, and a transpose operation may be performed in the first linear layer 410 and the second linear layer 420. Particularly, in the first linear layer 410, the reshape operation and the transpose operation may be performed after the matrix multiplication operation, and in the second linear layer 420, the reshape operation and the transpose operation may be performed before the matrix multiplication operation.

Hereinafter, a method of obtaining a multihead self-attention by using a matrix multiplication operation without performing a reshape operation and a transpose operation in the first linear layer 410 and the second linear layer 420 will be described.

Figure 5A:
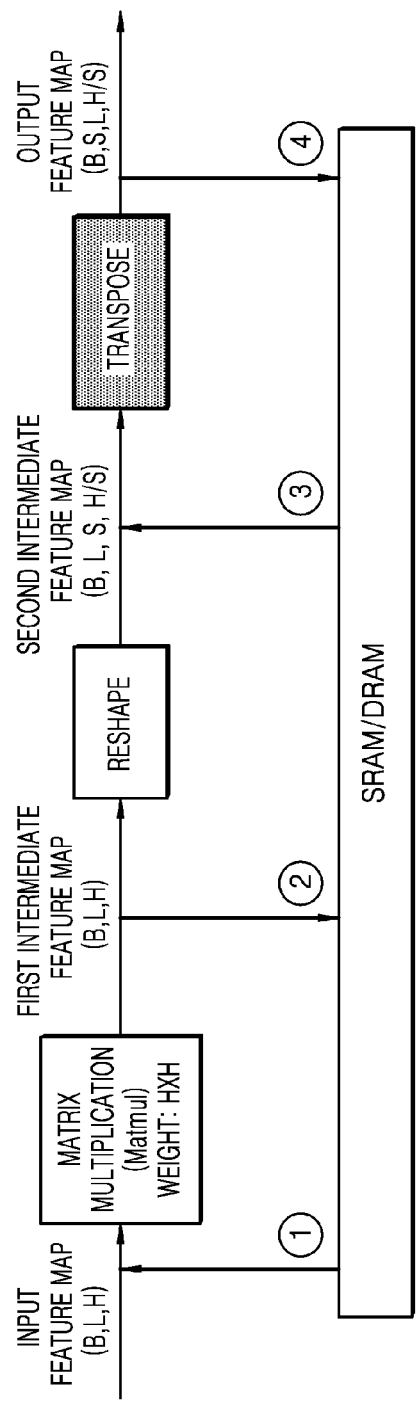
FIG. 5A is a diagram for describing the number of times accessing a memory in the case of performing a reshape operation and a transpose operation, according to an example.

FIG. 5A is a diagram for describing the number of times accessing a memory in the case of performing a reshape operation and a transpose operation, according to an example.

FIG. 5A may correspond to a portion of the process of obtaining a multihead self-attention and may correspond to a process performed in the first linear layer 410 of FIG. 4B.

Referring to FIG. 5A, an input feature map may have a (B, L, H) structure. In the (B, L, H) structure, B denotes a batch size, L denotes a row of the input feature map, and H denotes a column of the input feature map.

A matrix multiplication operation may be performed between the input feature map of the (B, L, H) structure and a weight of an (H, H) structure. The weight may be a structure having H rows and H columns. As a result of the performance of the matrix multiplication operation, a first intermediate feature map of a (B, L, H) structure may be generated. A reshape operation may be performed on the first intermediate feature map to generate a second intermediate feature map of a (B, L, S, H/S) structure. A transpose operation may be performed on the second intermediate feature map to generate an output feature map of a (B, H/S, L, S) structure.

In the process of generating the output feature map of the (B, S, L, H/S) structure from the input feature map of the (B, L, H) structure of FIG. 5A, a total of four read/write processes may be required on the memory (e.g., SRAM or DRAM).

Figure 5B:
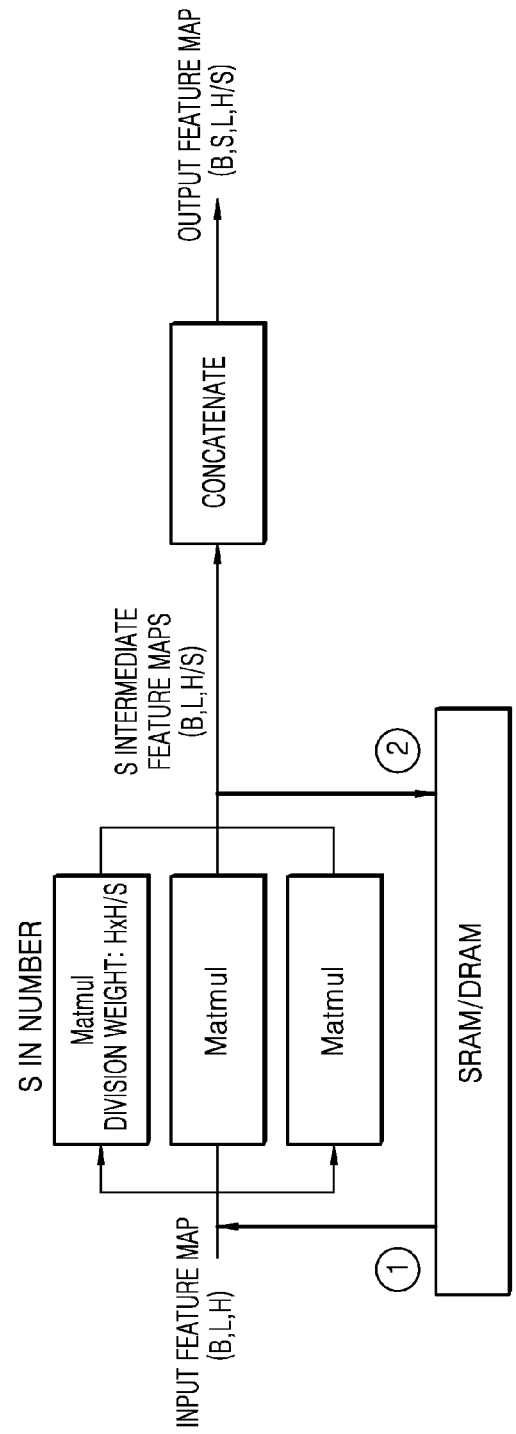
FIG. 5B is a diagram for describing the number of times accessing a memory in the case of not performing a reshape operation and a transpose operation, according to an example.

FIG. 5B is a diagram for describing the number of times accessing a memory in the case of not performing a reshape operation and a transpose operation, according to an example.

FIG. 5B may also correspond to a portion of the process of obtaining a multihead self-attention and may correspond to a process performed in the first linear layer 410 of FIG. 4B.

Referring to FIG. 5B, an input feature map may have a (B, L, H) structure. In the (B, L, H) structure, B denotes a batch size, L denotes a row of the input feature map, and H denotes a column of the input feature map.

In FIG. 5B, instead of performing a matrix multiplication operation between the input feature map of the (B, L, H) structure and an initial weight of an (H, H) structure, the initial weight of the (H, H) structure may be divided into S division weights having an (H, H/S) structure.

A matrix multiplication operation may be performed between the input feature map of the (B, L, H) structure and the S division weights of the (H, H/S) structure. As a result of the performance of the matrix multiplication operation, S intermediate feature maps of a (B, L, H/S) structure may be generated. The S intermediate feature maps of the (B, L, H/S) structure may be concatenated to finally generate an output feature map of a (B, S, L, H/S) structure.

In the process of generating the output feature map of the (B, S, L, H/S) structure from the input feature map of the (B, L, H) structure of FIG. 5B, a total of two read/write processes may be required on the memory (e.g., SRAM or DRAM).

The structure of the input feature map and the output feature map of FIG. 5A may be the same as the structure of the input feature map and the output feature map of FIG. 5B. As for the comparison between the memory access counts of FIGS. 5A and 5B, because the transpose operation is not performed in FIG. 5B, the memory access count in FIG. 5B may decrease in comparison with that in FIG. 5A. In FIG. 5B, the memory access count may decrease twice in comparison with that in FIG. 5A, and accordingly, the read/write data may decrease by 2*BLH (=B*L*S*H/S). Moreover, as the batch size increases, the effect of reducing the memory access count in the method according to FIG. 5B may be greater in comparison with FIG. 5A.

Figure 6:
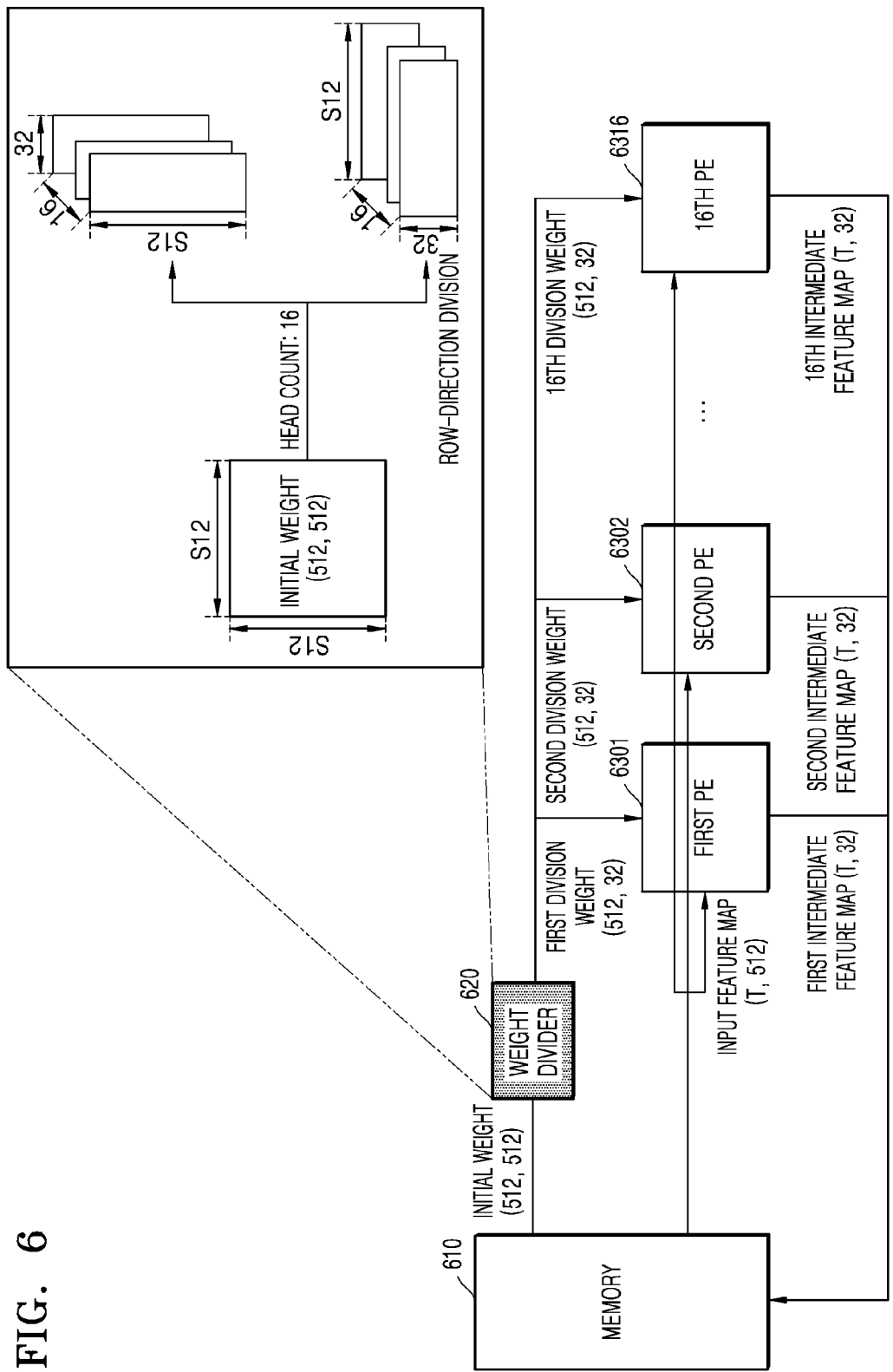
FIG. 6 is a diagram for describing a process of performing matrix multiplication by using a weight divider, according to an example.

FIG. 6 is an example diagram for describing a process of performing matrix multiplication by using a weight divider, according to an example.

Referring to FIG. 6, an initial weight and an input feature map may be stored in a memory 610. Hereinafter, it is assumed that the initial weight is a (512, 512) structure having 512 rows and 512 columns and the input feature map is a (T, 512) structure having T rows (T is a natural number) and 512 columns.

The initial weight of the (512, 512) structure stored in the memory 610 may be input to a weight divider 620. The weight divider 620 may divide the initial weight into a plurality of division weights. The weight divider 620 may divide the initial weight in any one of the column direction and the row direction.

Particularly, the weight divider 620 may determine whether to divide the initial weight of the (512, 512) structure in any one of the column direction and the row direction according to whether the reshape operation and the transpose operation are performed after or before the matrix multiplication operation.

For example, when the reshape operation and the transpose operation are performed after the matrix multiplication operation, the weight divider 620 may divide the initial weight of the (512, 512) structures in the column direction to generate a plurality of division weights. Alternatively, when the reshape operation and the transpose operation are performed before the matrix multiplication operation, the weight divider 620 may divide the initial weight of the (512, 512) structures in the row direction to generate a plurality of division weights.

Also, the weight divider 620 may divide the initial weight of the (512, 512) structure by the head count in the determined direction. For example, when the head count is 16, 16 division weights having a (512, 32) structure (column-direction division) or 16 division weights having a (32, 512) structure (row-direction division) may be generated depending on the division direction of the initial weight.

Each of the division weights generated by the weight divider 620 may be transmitted to a PE. The PE may perform a matrix multiplication operation on the division weight received from the weight divider 620 and the input feature map received from the memory 610. As a result of the performance of the matrix multiplication operation, an intermediate feature map may be output from the PE.

For example, when the weight divider 620 divides the initial weight of the (512, 512) structure in the column direction, the weight divider 620 may transmit the first to 16th division weights having the (512, 32) structure to first to 16th PEs 6301, 6302, ..., 6316, respectively. Also, the first to 16th PEs 6301 to 6316 may receive the input feature map from the memory 610.

The first PE 6301 may perform a matrix multiplication operation between the first division weight of the (512, 32) structure and the input feature map of the (T, 512) structure and output the first intermediate feature map of the (T, 32) structure. In the same way, the second to 16th PEs 6302 to 6316 may output the second to 16th intermediate feature maps of the (T, 32) structure, respectively.

Although FIG. 6 illustrates the case where the weight divider 620 divides the initial weight in the column direction, the above description may also be applied to the case where the weight divider 620 divides the initial weight in the row direction.

When the initial weight is divided in the column direction, the first to 16th intermediate feature maps of the (T, 32) structure output from the first to 16th PEs 6301 to 6316 may be concatenated to generate a final feature map. The final feature map may have a (16, T, 32) structure. In an example, the first to 16th intermediate feature maps may be sequentially stored at consecutive positions of the memory 610 and thus the first to 16th intermediate feature maps may be concatenated.

When the initial weight is divided in the row direction, a final feature map may be generated through the element-wise sum of the first to 16th intermediate feature maps output from the first to 16th PEs 6301 to 6316. The element-wise sum may be performed in the PE.

Although FIG. 6 illustrates that 16 PEs are used assuming that the head count is 16, the number of PEs used may be smaller or larger depending on the head count. Also, at least one PE may be used several times when a matrix multiplication operation is performed on one input feature map.

Figure 7:
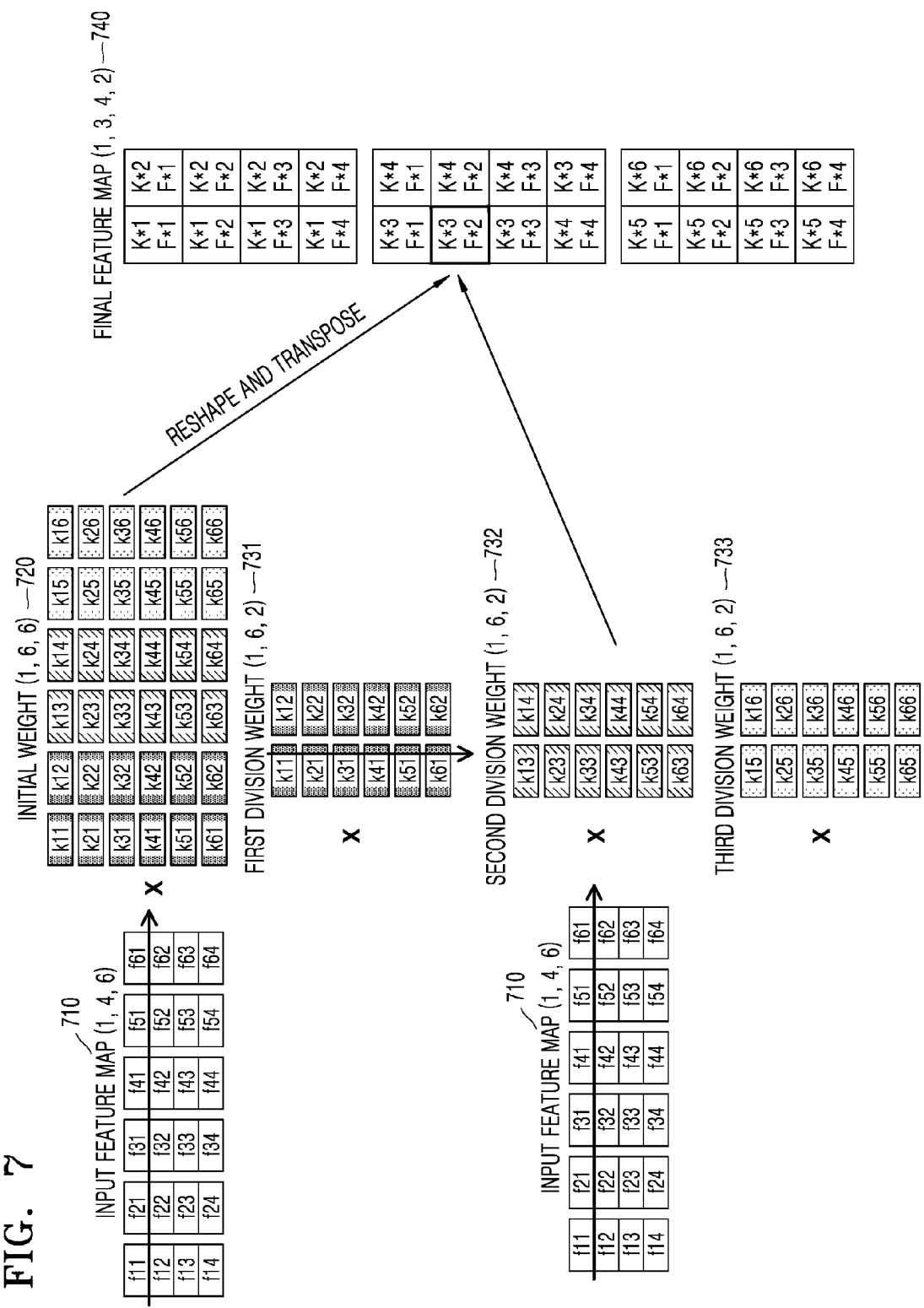
FIG. 7 is a diagram illustrating the result of performance of matrix multiplication in the case of a weight being divided in a column direction, according to an example.

FIG. 7 is an example diagram illustrating the result of performance of matrix multiplication in the case of a weight being divided in a column direction, according to an example.

FIG. 7 is a diagram illustrating the case where the reshape operation and the transpose operation are performed after the matrix multiplication operation.

Referring to FIG. 7, an input feature map 710 may have a (1, 4, 6) structure. That is, the input feature map 710 may have a structure of a batch size 1, 4 rows, and 6 columns. An initial weight 720 may have a (1, 6, 6) structure. That is, the initial weight 720 may have a structure of a batch size 1, 6 rows, and 6 columns.

A matrix multiplication operation may be performed on the input feature map 710 of the (1, 4, 6) structure and the initial weight 720 of the (1, 6, 6) structure, and then a reshape operation and a transpose operation may be performed on the operation result. As a result, a final feature map 740 of a (1, 3, 4, 2) structure may be generated. That is, the output feature map 740 may have a structure of a batch size 1, 3 channels, 4 rows, and 2 columns.

Moreover, the initial weight 720 may be divided in the column direction to generate a plurality of division weights. In this case, the number of division weights generated may be determined according to the head count. FIG. 7 is an example of the case where the head count is 3, and the initial weight 720 of the (1, 6, 6) structure may be divided into first, second, and third division weights 731, 732, and 733 of a (1, 6, 2) structure.

A matrix multiplication operation may be performed between the input feature map 710 of the (1, 4, 6) structure and the first to third division weights 731 to 733 of the (1, 6, 2) structure, and the operation results may be concatenated to generate the final feature map 740 of the (1, 3, 4, 2) structure.

In the example, when the reshape operation and the transpose operation are performed after the matrix multiplication operation, the initial weight 720 may be divided in the column direction to generate the first to third division weights 731 to 733 and the matrix multiplication operation may be performed between the input feature map 710 and the first to third division weights 731 to 733 to generate the same final feature map 740 as the case of having performed the reshape operation and the transpose operation.

Figure 8:
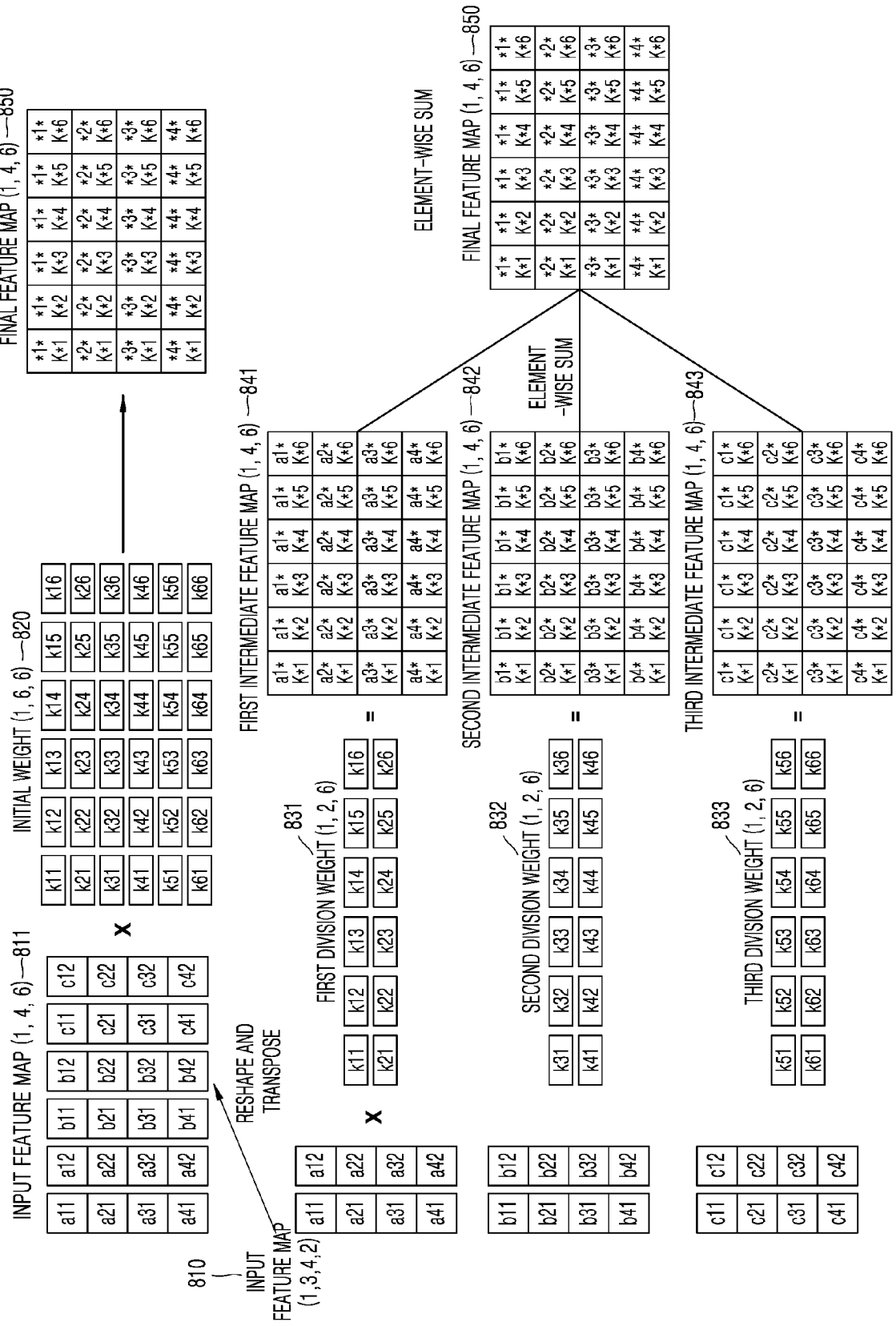
FIG. 8 is a diagram illustrating the result of performance of matrix multiplication in the case of a weight being divided in a row direction, according to an example.

FIG. 8 is an example diagram illustrating the result of performance of matrix multiplication in the case of a weight being divided in a row direction, according to an example.

Referring to FIG. 8, an input feature map 810 may have a (1, 3, 4, 2) structure. That is, the input feature map 810 may have a structure of a batch size 1, 3 channels, 4 rows, and 2 columns. When a reshape operation and a transpose operations are performed on the input feature map 810, an input feature map 811 may have a (1, 4, 6) structure. That is, the input feature map 811 may have a structure of a batch size 1, 4 rows, and 6 columns. An initial weight 820 may have a (1, 6, 6) structure. That is, the initial weight 820 may have a structure of a batch size 1, 6 rows, and 6 columns.

When a matrix multiplication operation is performed on the input feature map 811 of the (1, 4, 6) structure and the initial weight 820 of the (1, 6, 6) structure, a final feature map 850 of a (1, 4, 6) structure may be generated as a result thereof. That is, the final feature map 850 may have a structure of a batch size 1, 4 rows, and 6 columns.

Moreover, the initial weight 820 may be divided in the column direction to generate a plurality of division weights. In this case, the number of division weights generated may be determined according to the head count. FIG. 8 is an example of the case where the head count is 3, and the initial weight 820 of the (1, 6, 6) structure may be divided into first, second, and third division weights 831, 832, and 833 of a (1, 2, 6) structure.

A matrix multiplication operation may be performed between the input feature map 810 of the (1, 3, 4, 2) structure and the first to third division weights 831 to 833 of the (1, 2, 6) structure, and first, second, and third intermediate feature maps 841, 842, and 843 of a (1, 4, 6) structure may be generated as a result thereof. A final feature map 850 of a (1, 4, 6) structure may be generated through the element-wise sum of the first to third intermediate feature maps 841 to 843.

In the example, when the reshape operation and the transpose operation are performed before the matrix multiplication operation, the initial weight 820 may be divided in the row direction to generate the first to third division weights 831 to 833 and the matrix multiplication operation may be performed between the input feature map 810 and the first to third division weights 831 to 833 to generate the same final feature map 850 as the case of having performed the reshape operation and the transpose operation.

Figure 9:
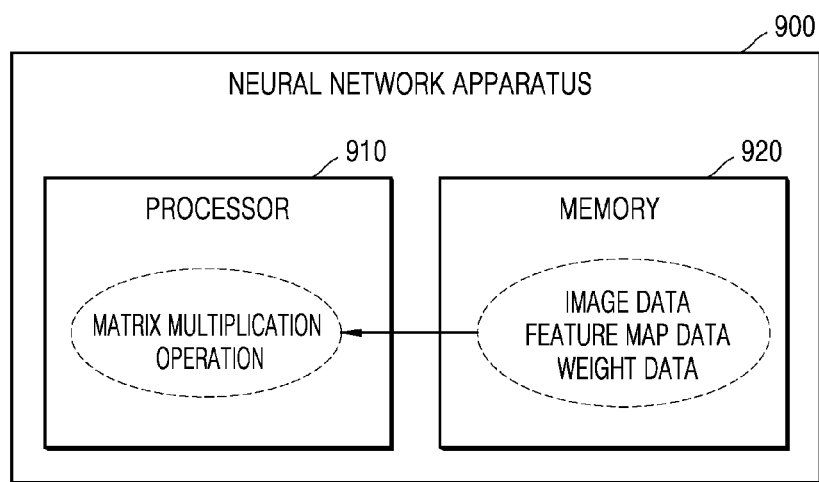
FIG. 9 is a block diagram illustrating a hardware configuration of a neural network apparatus according to an example.

FIG. 9 is a block diagram illustrating a hardware configuration of a neural network apparatus according to an example.

A neural network apparatus 900 may be implemented by various types of devices such as personal computers (PCs), server devices, mobile devices, or embedded devices, and as a particular example, the neural network apparatus 900 may correspond to a smart phone, a tablet device, an augmented reality (AR) device, an Internet of Things (IoT) device, an autonomous car, robotics, a medical apparatus, or the like performing voice recognition, image recognition, image classification, or the like by using a neural network, but is not limited thereto. In addition, the neural network apparatus 900 may correspond to a dedicated hardware (HW) accelerator mounted on the above device, and the neural network apparatus 900 may be a hardware accelerator such as a neural processing unit (NPU), a tensor processing unit (TPU), or a neural engine, which is a dedicated module for neural network driving, but is not limited thereto.

Referring to FIG. 9, the neural network apparatus 900 may include a processor 910 and a memory 920. In the neural network apparatus 900 illustrated in FIG. 9, only the components related to the various examples are illustrated. Thus, it will be apparent to those of ordinary skill in the art that the neural network apparatus 900 may further include other general-purpose components in addition to the components illustrated in FIG. 9.

The processor 910 may control overall functions for executing the neural network apparatus 900. For example, the processor 910 may generally control the neural network apparatus 900 by executing programs stored in the memory 920 in the neural network apparatus 900. The processor 910 may be implemented by a central processing unit (CPU), a graphics processing unit (GPU), an application processor (AP), or the like provided in the neural network apparatus 900, but is not limited thereto.

The memory 920 may be hardware for storing various data processed in the neural network apparatus 900, and for example, the memory 920 may store data processed or to be processed in the neural network apparatus 900. Also, the memory 920 may store applications, drivers, or the like to be driven by the neural network apparatus 900. The memory 920 may include random access memory (RAM) such as dynamic random access memory (DRAM) or static random access memory (SRAM), read-only memory (ROM), electrically erasable programmable read-only memory (EEPROM), CD-ROM, Blu-ray, other optical disk storages, a hard disk drive (HDD), a solid state drive (SSD), or a flash memory.

The processor 910 may read/write neural network data, for example, image data, feature map data, weight data, or the like from/to the memory 920 and execute the neural network by using the read/written data. When the neural network is executed, the processor 910 may repeatedly perform a convolution operation between an input feature map and a weight in order to generate data about an output feature map. In this case, the amount of the convolution operations may be determined depending on various factors such as the number of channels of the input feature map, the number of channels of the weight, the size of the input feature map, the size of the weight, and the precision of a value. Unlike the DNN 100 illustrated in FIG. 1, an actual neural network driven in the neural network apparatus 900 may be implemented in a more complex architecture. Accordingly, the processor 910 may perform a very large amount of operations (operation count), ranging from hundreds of millions to tens of billions, and the frequency with which the processor 910 accesses the memory 920 for an operation may also increase rapidly. Due to this operation load, the neural network may not be smoothly processed in a mobile device such as a smart phone, a tablet device, or a wearable device, an embedded device, or the like having a relatively low processing performance.

The processor 910 may perform a matrix multiplication operation, a reshape operation, and a transpose operation. In an example, the processor 910 may perform a matrix multiplication operation, a reshape operation, and a transpose operation in order to obtain a multihead self-attention. In the process of obtaining the multihead self-attention, the reshape operation and the transpose operation may be performed after or before the matrix multiplication operation.

The processor 910 may perform a portion of the process of obtaining the multihead self-attention even without performing the reshape operation and the transpose operation. The processor 910 may determine whether to divide an initial weight in any one of a column direction and a row direction according to whether the reshape operation and the transpose operation are performed after or before the matrix multiplication operation and generate a plurality of division weights by dividing the initial weight by a head count in the determined direction. The processor 910 may generate a plurality of intermediate feature maps by performing a matrix multiplication operation between the input feature map and the plurality of division weights and generate a final feature map based on the plurality of intermediate feature maps. In the above way, the processor 910 may reduce the number of times accessing the memory 920, by performing a portion of the process of obtaining the multihead self-attention even without performing the reshape operation and the transpose operation.

Figure 10:
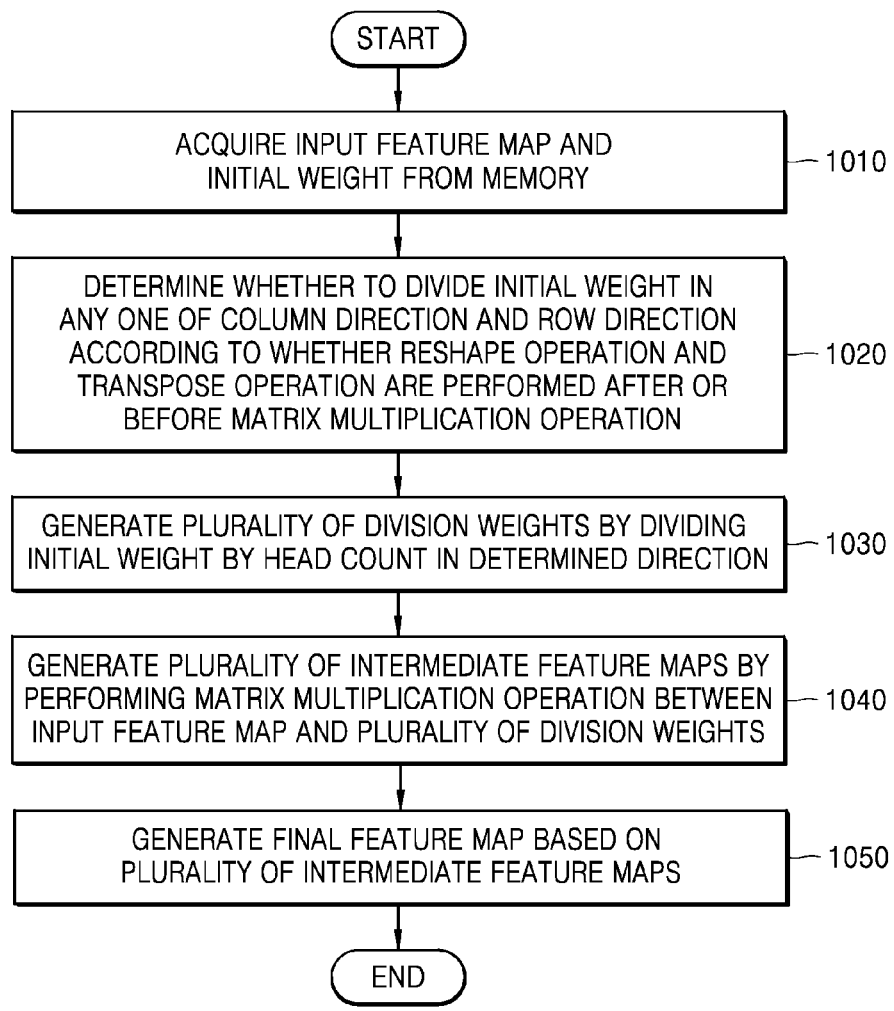
FIG. 10 is a flowchart of a method of performing a matrix multiplication operation in a neural network apparatus, according to an example.

FIG. 10 is a flowchart of a method of performing a matrix multiplication operation in a neural network apparatus, according to an example. Because the method of performing matrix multiplication operation in the neural network apparatus illustrated in FIG. 10 relates to the examples described above with reference to the above drawings, the descriptions given above with reference to the above drawings may also be applied to the method of FIG. 10 even though omitted below.

Referring to FIG. 10, in operation 1010, the neural network apparatus may obtain an input feature map and an initial weight from a memory.

In operation 1020, the neural network apparatus may determine whether to divide the initial weight in any one of a column direction and a row direction according to whether a reshape operation and a transpose operation are performed after or before the matrix multiplication operation.

When the reshape operation and the transpose operation are performed after the matrix multiplication operation, the neural network apparatus may divide the initial weight in the column direction of the initial weight. Alternatively, when the reshape operation and the transpose operation are performed before the matrix multiplication operation, the neural network apparatus may divide the initial weight in the row direction of the initial weight.

In operation 1030, the neural network apparatus may generate a plurality of division weights by dividing the initial weight by a head count in the direction determined in operation 1020.

For example, when the structure of the initial weight is (512, 512) and the head count is 16, 16 division weights having a (512, 32) structure (column-direction division) or 16 division weights having a (32, 512) structure (row-direction division) may be generated depending on the division direction of the initial weight.

In operation 1040, the neural network apparatus may generate a plurality of intermediate feature maps by performing a matrix multiplication operation between the input feature map and the plurality of division weights.

The matrix multiplication operation between the input feature map and the plurality of division weights may be any one of one-dimensional convolution and two-dimensional convolution operations.

In operation 1050, the neural network apparatus may generate a final feature map based on the plurality of intermediate feature maps.

When the initial weight is divided in the column direction in operation 1020, the neural network apparatus may generate the final feature map by concatenating the plurality of intermediate feature maps.

When the initial weight is divided in the row direction in operation 1020, the neural network apparatus may generate the final feature map through the element-wise sum of the plurality of intermediate feature maps.

The various examples may also be implemented in the form of a computer-readable recording medium including instructions executable by a computer, such as program modules executed by a computer. The computer-readable recording medium may be any available medium accessible by a computer and may include all of volatile or non-volatile mediums and removable or non-removable mediums. Also, the computer-readable recording medium may include all of computer storage mediums and communication mediums. The computer storage mediums may include all of volatile or non-volatile mediums and removable or non-removable mediums that are implemented by any method or technology to store information such as computer-readable instructions, data structures, program modules, or other data. For example, the communication mediums may include any information transmission medium and may include other transmission mechanisms or other data of modulated data signals such as computer-readable instructions, data structures, or program modules.

Also, herein, a "unit" may include a hardware component such as a processor or a circuit, and/or a software component executed by a hardware component such as a processor.

The foregoing is illustrative of various examples, and those of ordinary skill in the art will readily understand that various modifications may be made therein without materially departing from the spirit or features of the various examples. Therefore, it is to be understood that the examples described above should be considered in a descriptive sense only and not for purposes of limitation. For example, elements described as being combined may also be implemented in a distributed manner, and elements described as being distributed may also be implemented in a combined manner.

The scope of the various examples is defined not by the above detailed descriptions but by the following claims, and all modifications or differences within the scope of the claims should be construed as being included in the various examples.

According to the various examples, the same result may be obtained by repeating the matrix multiplication operation several times without performing the reshape operation and the transpose operation, and accordingly, the memory access count may be reduced and thus the memory power amount may be reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A neural network apparatus, comprising:
a memory having at least one program stored therein, the memory storing at least a portion of a neural network comprising a weight matrix and a number of heads of the deep neural network, the neural network further comprising an input layer, multiple hidden layers, and an output layer, each layer comprising a respective set of nodes, each layer other than the input layer having weights of connections to a preceding adjacent layer, the weight matrix comprising weight values of the weights, the weight matrix having a row dimension and a column dimension; and
a processor configured to perform one or more operations by executing the at least one program, wherein the processor is configured to:
read, from the memory, an input feature map and the weight matrix, wherein the processor is configured to perform a matrix operation on the input feature map and the weight matrix, the matrix operation comprising a matrix multiplication operation, a transpose operation, and a reshape operation, wherein the processor is configured to be capable of performing the transpose operation and the reshape operation before the matrix multiplication operation, and wherein the processor is configured to be capable of performing the transpose operation and the reshape operation after the matrix multiplication operation,
select between the column dimension and the row dimension as a split dimension, wherein the split dimension is selected according to whether the matrix operation is performed by performing the reshape operation and the transpose operation before or after the matrix multiplication operation,
split, in the selected the split dimension, the weight matrix into a number of weight sub-matrices based on the number of heads,
generate intermediate feature maps by performing the matrix multiplication operation between the input feature map and the weight sub-matrices,
generate a final feature map by performing an operation on the intermediate feature maps, and
generate activations of nodes, according to an activation function, of one of the layers of the neural network based on the final feature map.

2. The neural network apparatus of claim 1, wherein the processor is configured to:
split the weight matrix in the column dimension when the reshape operation and the transpose operation are to be performed after the matrix multiplication operation, and
wherein the operation comprises concatenating the intermediate feature maps.

3. The neural network apparatus of claim 1, wherein the processor is configured to:
split the weight matrix in the row dimension when the reshape operation and the transpose operation are to be performed before the matrix multiplication operation, and
wherein the operation comprises an element-wise sum of the intermediate feature maps.

4. The neural network apparatus of claim 1, wherein the matrix multiplication operation is either a one-dimensional convolution operation or a two-dimensional convolution operation.

5. The neural network apparatus of claim 1, wherein the processor comprises a weight divider to perform the splitting, and
the weight divider is configured to be capable of splitting the weight matrix by the number of heads in both the column dimension and in the row dimension.

6. A method in a neural network apparatus, the method comprising:
accessing at least a portion of a neural network comprising an input layer, multiple hidden layers, and an output layer, each layer comprising a respective set of nodes, each layer other than the input layer having weights of connections to a preceding adjacent layer, the neural network further comprising a weight matrix and a number of heads of the neural network, the weight matrix comprising weight values of the weights, the weight matrix having a row dimension and a column dimension
reading an input feature map and the weight matrix from a memory, wherein a matrix operation is performed on the input feature map and the weight matrix, wherein the matrix operation comprises a matrix multiplication operation, a transpose operation, and a reshape operation, wherein the method is capable of performing the transpose operation and the reshape operation before the matrix multiplication operation, and wherein the method is capable of performing the transpose operation and the reshape operation after the matrix multiplication operation;
selecting between a column dimension and a row dimension as a split dimension, wherein the split dimension is selected according to whether the reshape operation and the transpose operation are to be performed before or after the matrix multiplication operation;
splitting, in the selected split dimension, the weight matrix into a number weight sub-matrices based on the number of heads;
generating intermediate feature maps by performing the matrix multiplication operation between the input feature map and the weight sub-matrices;
generating a final feature map by performing an operation on the intermediate feature maps; and
generating activations of nodes, according to an activation function, of one of the layers of the neural network based on the final feature map.

7. The method of claim 6, further comprising:
splitting the weight matrix in the column dimension when the reshape operation and the transpose operation are to be performed after the matrix multiplication operation; and
wherein the operation comprises concatenating the intermediate feature maps.

8. The method of claim 6, further comprising:
splitting the weight matrix in the row dimension when the reshape operation and the transpose operation are to be performed before the matrix multiplication operation; and
wherein the operation comprises an element-wise sum of the intermediate feature maps.

9. The method of claim 6, wherein the matrix multiplication operation between the input feature map and the weight matrix is either a one-dimensional convolution operation or a two-dimensional convolution operation.

10. The method of claim 6, wherein splitting the weight matrix into weight sub-matrices comprises:
inputting the weight matrix to a weight divider; and
acquiring, from the weight divider, the weight sub-matrices into which the weight matrix is split.

11. A non-transitory computer-readable recording medium that stores a program that, when executed by a computer, performs the method of claim 6.

12. A method performed by one or more processors, the method comprising:
reading from a memory an input feature map and at least a portion of a neural network comprising an input layer, multiple hidden layers, and an output layer, each layer comprising a respective set of nodes, each layer other than the input layer having weights of connections to a preceding adjacent layer, the neural network further comprising a weight matrix, the weight matrix comprising weight values of the weights, the weight matrix having a row dimension and a column dimension, wherein a matrix operation is to be performed on the input feature map and the weight matrix, wherein the matrix operation comprises a matrix multiplication operation, and wherein the method is capable of performing the transpose operation and the reshape operation before the matrix multiplication operation, and wherein the method is capable of performing the transpose operation and the reshape operation after the matrix multiplication operation;
determining whether a column split dimension is a column dimension or a row dimension based on whether the transpose and reshape operations are performed before or after the matrix multiplication operation;
splitting the weight matrix into weight sub-matrices based on the number of heads;
performing the matrix multiplication operation between the input feature map and each of the weight sub-matrices to generate intermediate feature maps respectively corresponding to the weight sub-matrices, wherein an intermediate feature map is generated based on activations of nodes of a given layer according an intermediate feature map outputted by a layer preceding the given layer; and
performing an operation on the intermediate feature maps to generate an output feature map, and storing the output feature map in the memory.

13. The method of claim 12, further comprising determining whether a reshape operation and a transpose operation have been performed on the input feature map.

14. The method of claim 13, wherein the neural network comprises a transformer neural network comprising a number of heads, and wherein, in a case in which the input feature map has been subjected to the reshape operation and the transpose operation, the weight matrix is split, in the row dimension, into the weight sub-matrices based on the number of heads.

15. The method of claim 14, wherein the operation comprises an element-wise sum of the intermediate feature maps.

16. The method of claim 13, wherein, in a case in which the input feature map has not been subjected to the reshape operation and the transpose operation, the weight matrix is split into the weight sub-matrices, based on the number of heads, in the column dimension.

17. The method of claim 16, wherein the operation comprises concatenating the intermediate feature maps.

18. A non-transitory computer-readable recording medium that stores a program that, when executed by a computer, performs the method of claim 12.

19. The neural network apparatus of claim 1, further comprising an accelerator comprising processing elements (PEs), wherein each processing element performs a portion of the matrix multiplication operation on a respective weight sub-matrix.

20. The method of claim 12, wherein the neural network comprises a transformer neural network, and wherein the method further comprises performing an inference operation of the neural network using the output feature map.

* * * * *